United States Patent
Cho et al.

(10) Patent No.: US 10,975,110 B2
(45) Date of Patent: Apr. 13, 2021

(54) LIGAND COMPOUND, TRANSITION METAL COMPOUND, AND CATALYST COMPOSITION COMPRISING THE TRANSITION METAL COMPOUND

(71) Applicant: LG Chem, Ltd., Seoul (KR)

(72) Inventors: Yoon Hee Cho, Daejeon (KR); Jae Kwon Jang, Daejeon (KR)

(73) Assignee: LG Chem, Ltd.

( * ) Notice: Subject to any disclaimer, the term of this patent is extended or adjusted under 35 U.S.C. 154(b) by 43 days.

(21) Appl. No.: 16/343,881

(22) PCT Filed: Sep. 20, 2018

(86) PCT No.: PCT/KR2018/011105
§ 371 (c)(1),
(2) Date: Apr. 22, 2019

(87) PCT Pub. No.: WO2019/059665
PCT Pub. Date: Mar. 28, 2019

(65) Prior Publication Data
US 2019/0263844 A1    Aug. 29, 2019

(30) Foreign Application Priority Data

Sep. 25, 2017 (KR) .................. 10-2017-0123710

(51) Int. Cl.
| | | |
|---|---|---|
| *C07F 17/00* | (2006.01) | |
| *C08F 4/6592* | (2006.01) | |
| *C08F 10/00* | (2006.01) | |
| *C07F 7/28* | (2006.01) | |
| *C07F 7/10* | (2006.01) | |
| *C08F 210/16* | (2006.01) | |
| *C08F 4/52* | (2006.01) | |
| *C08F 4/659* | (2006.01) | |
| *C08F 2/38* | (2006.01) | |

(52) U.S. Cl.
CPC .................. *C07F 7/28* (2013.01); *C07F 7/10* (2013.01); *C08F 2/38* (2013.01); *C08F 4/52* (2013.01); *C08F 4/659* (2013.01); *C08F 4/6592* (2013.01); *C08F 10/00* (2013.01); *C08F 210/16* (2013.01)

(58) Field of Classification Search
CPC ......... C07F 17/00; C08F 4/6592; C08F 10/00
See application file for complete search history.

(56) References Cited

U.S. PATENT DOCUMENTS

| | | |
|---|---|---|
| 5,064,802 A | 11/1991 | Stevens et al. |
| 6,015,916 A | 1/2000 | Sullivan et al. |
| 6,515,155 B1 | 2/2003 | Klosin et al. |
| 8,173,828 B2 | 5/2012 | Voskoboynikov et al. |
| 2002/0147286 A1 | 10/2002 | Resconi et al. |
| 2005/0010039 A1 | 1/2005 | Graf et al. |
| 2013/0203949 A1 | 8/2013 | Lee et al. |

FOREIGN PATENT DOCUMENTS

| | | |
|---|---|---|
| KR | 20010112350 | 12/2001 |
| KR | 20130124269 | 11/2013 |
| KR | 20160084181 | 7/2016 |
| WO | 0148040 A1 | 7/2001 |
| WO | 0153360 A1 | 7/2001 |
| WO | 03078480 A2 | 9/2003 |

OTHER PUBLICATIONS

Hongkun Tian et al., "An asymmetric oligomer based on thienoacene for solution processed crystal organic thin-film transistors", Chemical Communications, Received Jan. 18, 2012, Accepted Feb. 22, 2012, pp. 3557-3559.
International Search Report for Application No. PCT/KR2018/011105 dated Dec. 21, 2018.
Extended European Search Report including Written Opinion for Application No. EP18858677.0 dated Nov. 18, 2019.

*Primary Examiner* — Caixia Lu
(74) *Attorney, Agent, or Firm* — Lerner, David, Littenberg, Krumholz & Mentlik, LLP

(57) ABSTRACT

The present invention relates to a novel ligand compound, a transition metal compound and a catalyst composition comprising the same. The novel ligand compound and the transition metal compound of the present invention may be useful as a catalyst of polymerization reaction for preparing an olefin-based polymer having a low density.

13 Claims, No Drawings

LIGAND COMPOUND, TRANSITION METAL COMPOUND, AND CATALYST COMPOSITION COMPRISING THE TRANSITION METAL COMPOUND

CROSS-REFERENCE TO RELATED APPLICATIONS

The present application is a national phase entry under 35 U.S.C. § 371 of International Application No. PCT/KR2018/011105 filed Sep. 20, 2018, which claims priority from Korean Patent Application No. 10-2017-0123710 filed Sep. 25, 2017, all of which are incorporated herein by reference.

TECHNICAL FIELD

The present invention relates to a ligand compound having a novel structure, a transition metal compound, and a catalyst composition comprising the transition metal compound.

BACKGROUND ART

Generally, olefin polymers such as an ethylene copolymer are useful polymer materials used as the material for hollow molded product, an extrusion molded product, a film, a sheet, etc., and have been prepared in the presence of a Ziegler-Natta catalyst system.

The Ziegler-Natta catalyst is a heterogeneous catalyst and is a catalyst used in a system in which the phase of a reactant and the phase of a catalyst are not the same, for example, a system of liquid reactant-solid catalyst, or the like. Such a Ziegler-Natta catalyst is composed of two components and is generally composed of a halogen compound of a transition metal comprising titanium (Ti), vanadium (V), chromium (Cr), molybdenum (Mo), and zirconium (Zr) (for example, $TiCl_4$), alkyllithium, alkylaluminum, etc.

However, the Ziegler-Natta catalyst has the concentration of active species of a few % to tens of % with respect to a transition metal atom, and most transition metal atoms may not demonstrate their function and have defects of not overcoming the limitations as a heterogeneous catalyst.

Recently, as a next generation catalyst which may overcome such defects, metallocene compounds have received the attention. The metallocene compounds are homogeneous catalysts comprising a metal in group 4 and are known to show desirable polymerization activity in olefin polymerization.

$[Me_2Si(Me_4C_5)NtBu]TiCl_2$ (Constrained-Geometry Catalyst, hereinafter, will be abbreviated as CGC) was reported by Dow Co. in the early 1990s (U.S. Pat. No. 5,064,802), and excellent aspects of the CGC in the copolymerization reaction of ethylene and alpha-olefin may be summarized in the following two points when compared to commonly known metallocene catalysts: (1) at a high polymerization temperature, high activity is shown and a polymer having high molecular weight is produced, and (2) the copolymerization degree of alpha-olefin having large steric hindrance such as 1-hexene and 1-octene is excellent. In addition, as various properties of the CGC during performing a polymerization reaction are gradually known, efforts of synthesizing the derivatives thereof and using as a polymerization catalyst have been actively conducted in academy and industry.

Most metallocene catalysts used for polymerization comprise a metal element in group 4 such as titanium, zirconium, and hafnium (Hf) and a supporting ligand as a precursor, and are composed of two aromatic five-member rings and two halogen compounds which are leaving groups. Among them, an aromatic cyclopentadienyl group is generally used as the supporting ligand which is coordinated into a central metal.

Though such a metallocene catalyst is used in a variety of applications comprising an olefin polymerization process, the catalyst activity showed some limitations (particularly in a solution process at temperature conditions of 100° C. or higher), and it is known that, for example, due to a relatively rapid terminal termination reaction (or chain reaction) such as a beta-hydride elimination reaction, an olefin polymer with a low molecular weight showing a molecular weight (Mn) of 20,000 or less at a temperature of 100° C. or higher may be prepared. In addition, the active species of the metallocene catalyst is known to be deactivated at a temperature of 100° C. or higher. Accordingly, in order to increase the applicability of the metallocene catalyst, methods for overcoming the above-mentioned limitations are necessary.

DISCLOSURE OF THE INVENTION

Technical Problem

According to an aspect of the present invention, a novel transition metal compound is provided.

According to another aspect of the present invention, a novel ligand compound is provided.

According to further another aspect of the present invention, a catalyst composition comprising the transition metal compound is provided.

Technical Solution

To solve the above-described first task, there is provided in the present invention a transition metal compound represented by the following Formula 1:

[Formula 1]

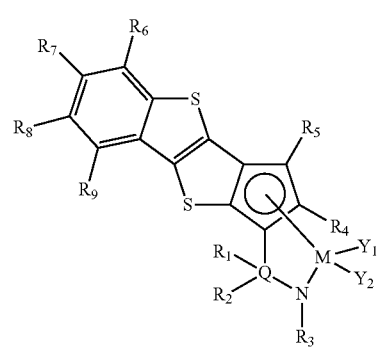

in Formula 1, $R_1$ and $R_2$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_4$ to $R_9$ are each independently hydrogen; silyl; alkyl of 1 to 20 carbon atoms; cycloalkyl of 3 to 20 carbon atoms;

alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; wherein adjacent two or more among $R_4$ to $R_9$ may be connected with each other to form a ring, Q is Si, C, N, P or S, M is a transition metal in group 4, and $Y_1$ and $Y_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

To solve the above-described second task, there is provided in the present invention a ligand compound represented by the following Formula 2:

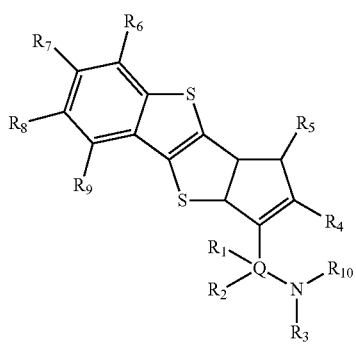

[Formula 2]

in Formula 2, $R_1$, $R_2$ and $R_{10}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_4$ to $R_9$ are each independently, hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; wherein adjacent two or more among $R_4$ to $R_9$ may be connected with each other to form a ring, and Q is Si, C, N, P or S.

To solve the above-described third task, there is provided in the present invention a catalyst composition comprising the transition metal compound of Formula 1 above.

Advantageous Effects

The novel ligand compound and the transition metal compound of the present invention may be useful as a catalyst of polymerization reaction for preparing an olefin-based polymer having a high molecular weight in a low density region, and a polymer having a low melt index (MI) and a low molecular weight may be obtained.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The transition metal compound of the present invention is represented by the following Formula 1:

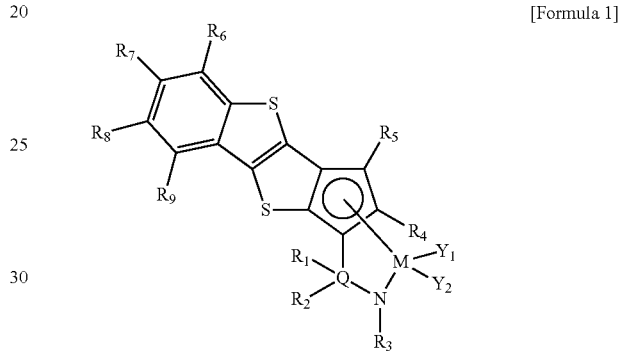

[Formula 1]

in Formula 1, $R_1$ and $R_2$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; wherein adjacent two or more among $R_4$ to $R_9$ may be connected with each other to form a ring, Q is Si, C, N, P or S, M is a transition metal in group 4, and $Y_1$ and $Y_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

The transition metal compound of Formula 1 according to the present invention forms a structure in which cyclopentadiene fused with benzothiophene via a ring type bond and an amido group (N—$R_3$) are stably bridged by Q (Si, C, N, P or S), and a transition metal in group 4 makes a coordination bond.

In case of applying the catalyst composition in olefin polymerization, the production of polyolefin with high activity at a high polymerization temperature, a high molecular weight and high copolymerization degree is capable. Particularly, due to the structural characteristics of a catalyst, a large amount of alpha-olefin as well as linear polyethylene with a low density to a degree of 0.860 g/cc to 0.930 g/cc may be introduced, and a polymer (elastomer) in a very low density region such as a density of less than 0.865 g/cc may be prepared.

The term "halogen" used in the present description means fluorine, chlorine, bromine or iodine unless otherwise noted.

The term "alkyl" used in the present description means linear, cyclic or branched hydrocarbon residue unless otherwise noted.

The term "cycloalkyl" used in the present description means cyclic alkyl such as cyclopropyl unless otherwise noted.

The term "aryl" used in the present description means an aromatic group such as phenyl, naphthyl anthryl, phenanthryl, chrysenyl, and pyrenyl unless otherwise noted.

The term "alkenyl" used in the present description means linear or branched alkenyl unless otherwise noted.

In the present description, silyl may be silyl which is substituted with alkyl of 1 to 20 carbon atoms, for example, trimethylsilyl or triethylsilyl.

In the transition metal compound of Formula 1 according to an embodiment of the present invention, $R_1$ and $R_2$ are be each independently hydrogen; halogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ is hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, $R_4$ to $R_9$ are each independently hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms, wherein adjacent two or more among $R_4$ to $R_9$ may be connected with each other to form an aliphatic ring of 5 to 20 carbon atoms or an aromatic ring of 6 to 20 carbon atoms; and the aliphatic ring or the aromatic ring may be substituted with halogen, alkyl of 1 to 20 carbon atoms, alkenyl of 2 to 12 carbon atoms, or aryl of 6 to 12 carbon atoms, Q is Si, M is Ti, and $Y_1$ and $Y_2$ may be each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; or arylamino of 6 to 12 carbon atoms.

In addition, in the transition metal compound of Formula 1 according to another embodiment of the present invention, $R_1$ and $R_2$ are each independently hydrogen; halogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms, $R_3$ is hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, $R_4$ to $R_9$ are each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms, wherein adjacent two or more among $R_4$ to $R_9$ may be connected with each other to form an aliphatic ring of 5 to 12 carbon atoms or an aromatic ring of 6 to 12 carbon atoms; and the aliphatic ring or the aromatic ring may be substituted with halogen, alkyl of 1 to 12 carbon atoms, alkenyl of 2 to 12 carbon atoms, or aryl of 6 to 12 carbon atoms, Q is Si, M is Ti, and $Y_1$ and $Y_2$ may be each independently hydrogen; halogen; alkyl of 1 to 12 carbon atoms; or alkenyl of 2 to 12 carbon atoms.

In addition, in the transition metal compound of Formula 1 according to another embodiment of the present invention, $R_1$ and $R_2$ are each independently hydrogen; halogen; alkyl of 1 to 12 carbon atoms; cycloalkyl of 3 to 12 carbon atoms; or alkoxy of 1 to 12 carbon atoms, $R_3$ is hydrogen; halogen; alkyl of 1 to 12 carbon atoms; cycloalkyl of 3 to 12 carbon atoms; alkenyl of 2 to 12 carbon atoms; or alkoxy of 1 to 12 carbon atoms, $R_4$ and $R_5$ are each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms, $R_6$ to $R_9$ are each independently hydrogen; halogen; alkyl of 1 to 12 carbon atoms; or cycloalkyl of 3 to 12 carbon atoms, Q is Si, M is Ti, and $Y_1$ and $Y_2$ may be each independently hydrogen; halogen; alkyl of 1 to 12 carbon atoms; or alkenyl of 2 to 12 carbon atoms.

In addition, in the transition metal compound of Formula 1 according to another embodiment of the present invention, $R_1$ to $R_3$ are each independently hydrogen or alkyl of 1 to 12 carbon atoms, $R_4$ and $R_5$ are each independently hydrogen; alkyl of 1 to 12 carbon atoms; or phenyl, $R_6$ to $R_9$ are each independently hydrogen or methyl, Q is Si, M is Ti, and $Y_1$ and $Y_2$ may be each independently hydrogen; halogen; or alkyl of 1 to 12 carbon atoms.

In addition, in the transition metal compound of Formula 1 according to another embodiment of the present invention, $R_1$ and $R_2$ are each independently alkyl of 1 to 6 carbon atoms, $R_3$ is alkyl of 1 to 6 carbon atoms, $R_4$ is alkyl of 1 to 6 carbon atoms; or phenyl, $R_5$ is hydrogen; alkyl of 1 to 6 carbon atoms; or phenyl, $R_6$ to $R_9$ are hydrogen, Q is Si, M is Ti, and $Y_1$ and $Y_2$ may be each independently halogen or alkyl of 1 to 6 carbon atoms.

The compound represented by Formula 1 may be a compound represented by any one among the following Formulae 1-1 to 1-4:

[Formula 1-1]

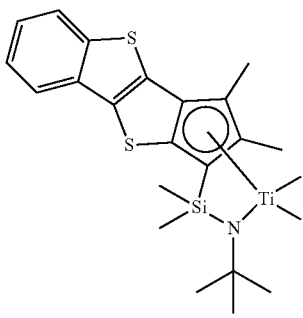

[Formula 1-2]

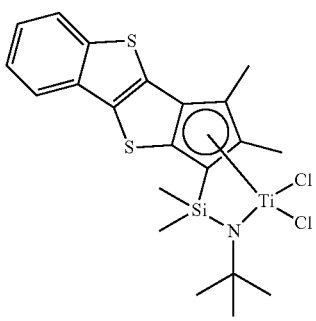

[Formula 1-3]

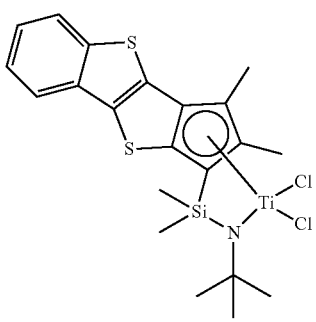

[Formula 1-4]

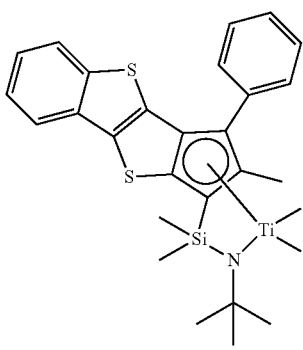

In addition, in order to accomplish the second technical task, there is provided in the present invention a ligand compound represented by the following Formula 2:

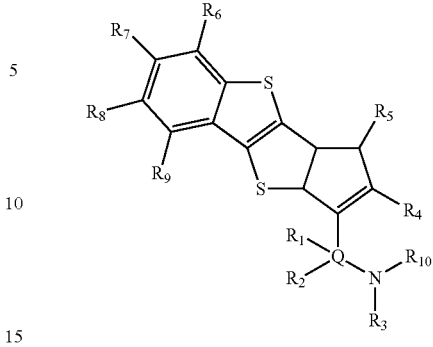

[Formula 2]

in Formula 2, $R_1$, $R_2$ and $R_{10}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; wherein adjacent two or more among $R_4$ to $R_9$ may be connected with each other to form a ring, and Q is Si, C, N, P or S.

The ligand compound of Formula 2 mentioned in the description has a stably bridged structure by the cyclic type bond of cyclopentadiene which is fused by benzothienophene and an amido group (N—$R_3$) via Q (Si, C, N, P or S).

In the ligand compound, the definition of $R_1$ to $R_9$ of the compound represented by Formula 2 may be the same as the definition in the compound represented by Formula 1 above, which is a transition metal compound.

In the ligand compound of Formula 2 according to another embodiment of the present invention, $R_1$ and $R_2$ are each independently hydrogen; halogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ and $R_{10}$ are each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, $R_4$ to $R_9$ are each independently hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms, wherein adjacent two or more among $R_4$ to $R_9$ may be connected with each other to form an aliphatic ring of 5 to 20 carbon atoms or an aromatic ring of 6 to 20 carbon atoms; and the aliphatic ring or the aromatic ring may be substituted with halogen, alkyl of 1 to 20 carbon atoms, alkenyl of 2 to 12 carbon atoms, or aryl of 6 to 12 carbon atoms, Q is Si, M is Ti, and $Y_1$ and $Y_2$ may be each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; or arylamino of 6 to 12 carbon atoms.

In addition, in the ligand compound of Formula 2 according to another embodiment of the present invention, $R_1$ and $R_2$ are each independently hydrogen; halogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms, $R_3$ and $R_{10}$ are each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, $R_4$ to $R_9$ are each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms, wherein adjacent two or more among $R_3$ to $R_8$ may be connected with each other to form an aliphatic ring of 5 to 12 carbon atoms or an aromatic ring of 6 to 12 carbon atoms; and the aliphatic ring or the aromatic ring may be substituted with halogen, alkyl of 1 to 12 carbon atoms, alkenyl of 2 to 12 carbon atoms, or aryl of 6 to 12 carbon atoms, and Q may be Si.

In addition, in Formula 2, $R_1$ to $R_2$ are each independently hydrogen or alkyl of 1 to 12 carbon atoms, $R_3$ is alkyl of 1 to 12 carbon atoms, $R_4$ and $R_5$ are each independently hydrogen; alkyl of 1 to 12 carbon atoms; or phenyl, $R_6$ to $R_9$ are each independently hydrogen or methyl, $R_{10}$ is hydrogen, and Q may be Si.

In addition, in Formula 2, $R_1$ and $R_2$ are each independently alkyl of 1 to 6 carbon atoms, $R_3$ is alkyl of 1 to 6 carbon atoms, $R_4$ is alkyl of 1 to 6 carbon atoms, $R_5$ is hydrogen; alkyl of 1 to 6 carbon atoms; or phenyl, $R_6$ to $R_{10}$ are hydrogen, and Q may be Si.

The compound represented by Formula 2 may particularly be any one of the compounds represented by the following Formulae 2-1 to 2-3:

[Formula 2-1]

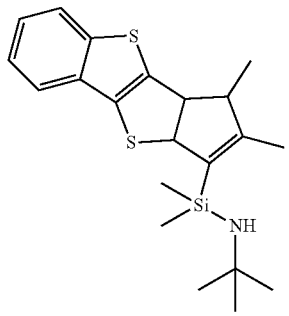

[Formula 2-2]

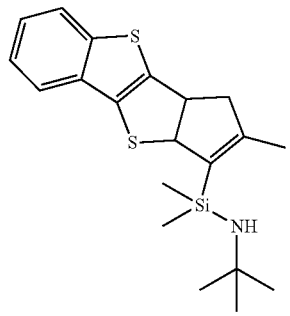

[Formula 2-3]

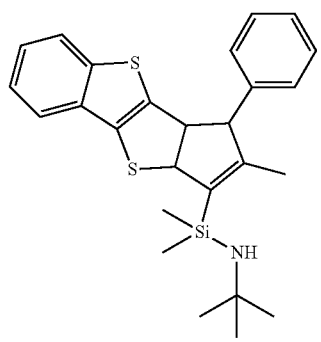

The transition metal compound of Formula 1 and the ligand compound of Formula 2 may particularly be used for preparing a catalyst for polymerizing an olefin monomer, and may be used in all other fields in which the transition metal compound may be used, without limitation.

The ligand compound represented by Formula 2 of the present invention may be prepared by a method comprising the following steps a) to f):

a) a step of reacting a compound represented by Formula 3 below with a compound represented by Formula 4 below to prepare a compound represented by Formula 5 below;

b) a step of treating the compound represented by Formula 5 with a base and then, reacting with an oxidant to prepare a compound represented by Formula 6 below;

c) a step of reacting the compound represented by Formula 6 below with a compound represented by Formula 7 below to prepare a compound represented by Formula 8 below;

d) a step of reacting the compound represented by Formula 8 with a reducing agent to prepare a compound represented by Formula 9 below;

e) a step of reacting the compound represented by Formula 9 with a compound represented by Formula 10 below to prepare a compound represented by Formula 11 below; and f) a step of reacting the compound represented by Formula 11 with a compound represented by Formula 12 below to prepare a ligand compound represented by Formula 2 below:

[Formula 3]

[Formula 4]

[Formula 5]

[Formula 6]

[Formula 7]

[Formula 8]

[Formula 9]

[Formula 10]

[Formula 11]

[Formula 12]

in the above formulae, X is halogen, $R_1$ to $R_{10}$ and Q are the same as defined in Formula 2 above.

An embodiment of steps a) and b), which are processes for preparing the compound represented by Formula 6 may be represented by the following Reaction 1:

[Reaction 1]

In Reaction 1, X is halogen, $R_6$ to $R_9$ are the same as defined in Formula 2. The reaction represented by Reaction 1 may be carried out by a method described in a document [Chem., Commun., 2012, 48, 3557], and in step b), the base may comprise, for example, NaOH, KOH, Ba(OH)$_2$, etc., and the oxidant may comprise CuO, MnO$_4$, CrO$_3$, ClO, etc.

In addition, an embodiment of steps c) to f), which are processes for preparing the ligand represented by Formula 2 from the compound represented by Formula 6 may be represented by the following Reaction 2:

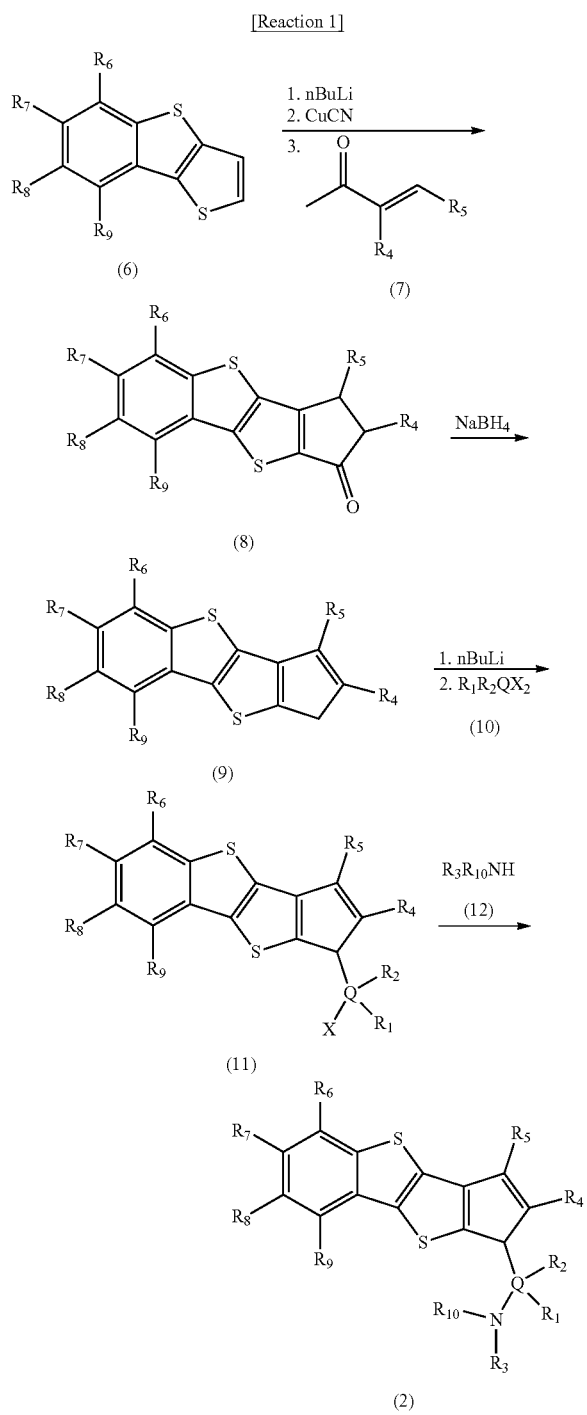

In reaction 2, X is halogen, $R_1$ to $R_{10}$, and Q are the same as defined in Formula 2.

In step c), the compound represented by Formula 6 and the compound represented by Formula 7 are reacted to prepare the compound represented by Formula 8.

In an embodiment of the present invention, the reaction of step c) may be performed in an organic solvent such as tetrahydrofuran and may be performed through the processes of dissolving the compound represented by Formula 6 in the organic solvent, adding an organolithium compound at a temperature of 0° C. or less, particularly, −30° C. to −150° C., adding a metal cyanide, and reacting with the compound represented by Formula 7 at a temperature of 0° C. or less, particularly, −30° C. to −150° C. The compound represented by Formula 6 and the compound represented by Formula 7 may be mixed in an equivalent ratio of 1:1 to 1:1.5, particularly, 1:1 to 1:1.1.

The organolithium compound and the compound represented by Formula 6 may be used in an equivalent ratio of 1:1 to 1:5, particularly, in an equivalent ratio of 1:1 to 1:2.5. The organolithium compound may be, for example, one or more selected from the group consisting of n-butyllithium, sec-butyllithium, methyllithium, ethyllithium, isopropyllithium, cyclohexyllithium, allyllithium, vinyllithium, phenyllithium and benzyllithium.

The metal cyanide and the compound represented by Formula 6 may be used in an equivalent ratio of 1:0.3 to 1:2, particularly, in an equivalent ratio of 1:0.3 to 1:1.

In step d), the compound represented by Formula 8 and the reducing agent are reacted to prepare the compound represented by Formula 9.

In an embodiment of the present invention, the reaction of step d) may be performed in an organic solvent such as tetrahydrofuran, and may be performed by dissolving the compound represented by Formula 8 in the organic solvent and then, reacting with a reducing agent such as NaBH$_4$.

In step d), the reducing agent with respect to the compound represented by Formula 8 may be used in an equivalent ratio of 1:1 to 1:2, particularly, in an equivalent ratio of 1:1.3 to 1:1.7.

In step e), the compound represented by Formula 9 and the compound represented by Formula 10 are reacted to prepare the compound represented by Formula 11.

In an embodiment of the present invention, the reaction of step e) may be performed in an organic solvent such as tetrahydrofuran and may be performed through the processes of dissolving the compound represented by Formula 9 in the organic solvent, adding an organolithium compound at a temperature of 0° C. or less, particularly, −30° C. to −150° C., and stirring, and reacting with the compound represented by Formula 10 at a temperature of 0° C. or less, particularly, −30° C. to −150° C. The compound represented by Formula 9 and the compound represented by Formula 10 may be mixed in an equivalent ratio of 1:1 to 1:10, particularly, 1:3 to 1:6. The organolithium compound with respect to the compound represented by Formula 9 may be used in an equivalent ratio of 1:1 to 1:5, particularly, 1:1 to 1:2.5.

In step f), the compound represented by Formula 11 and the compound represented by Formula 12 are reacted to prepare a ligand compound represented by Formula 2.

The compound represented by Formula 11 and the compound represented by Formula 12 are used in an equivalent ratio of 1:2 to 1:12, particularly, 1:3 to 1:9.

Meanwhile, the transition metal compound represented by Formula 1 of the present invention may be prepared by reacting a compound represented by Formula 2 below with an organolithium compound; one or more among the compounds represented by Formula 13a and Formula 13b below; and a compound represented by Formula 14 below:

[Formula 2]

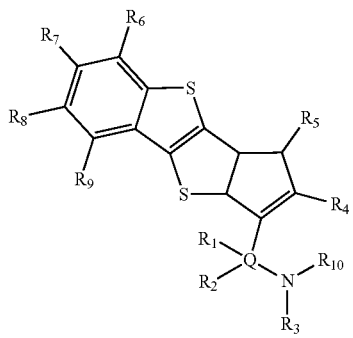

Y₁MgBr  [Formula 13a]

Y₂MgBr  [Formula 13b]

MX₄  [Formula 14]

[Formula 1]

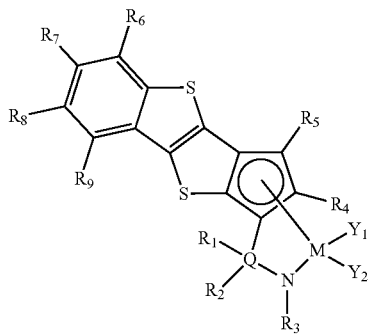

in the above formulae, $R_1$ to $R_{10}$, Q, M, $Y_1$ and $Y_2$ are the same as defined in Formula 1 above.

According to an embodiment of the present invention, the transition metal compound represented by Formula 1 may have a structure in which a transition metal in group 4 makes a coordination bond with the compound represented by Formula 2 as a ligand.

An embodiment of a preparing process of the transition metal compound of Formula 1 by reacting the ligand compound represented by Formula 2 with an organolithium compound; one or more among the compounds represented by Formula 13a and Formula 13b; and a compound represented by Formula 14, is represented by the following Reaction 3:

[Reaction 3]

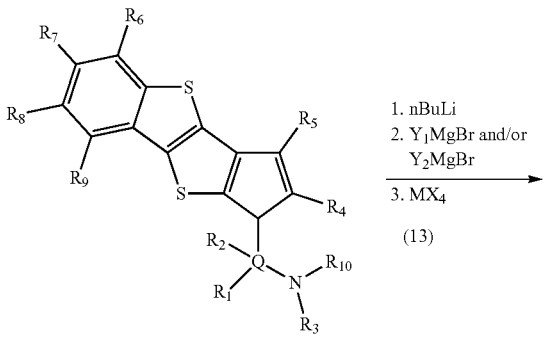

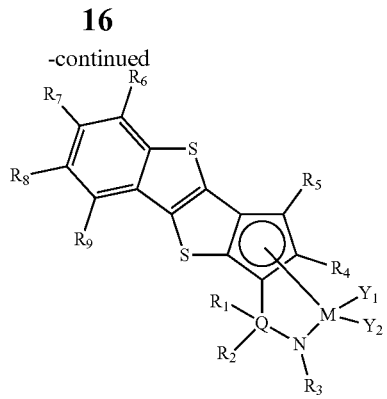

(1)

In Reaction 3, $R_1$ to $R_{10}$, Q, M, $Y_1$ and $Y_2$ are the same as defined in Formula 1 or Formula 2.

Particularly, as shown in Reaction 3, by reacting the compound represented by Formula 2 with an organolithium compound and one or more among the compounds represented by Formula 13a and Formula 13b which are Grignard reagents, and then, reacting with the compound represented by Formula 14 which is a metal precursor, the transition metal compound of Formula 1 in which a transition metal in group 4 makes a coordination bond with the compound represented by Formula 2 as a ligand, may be obtained.

The compound represented by Formula 2 and the compound represented by Formula 14 may be mixed in an equivalent ratio of 1:0.8 to 1:1.5, particularly, 1:1.0 to 1:1.1. In addition, the organolithium compound and the compound represented by Formula 2 may be used in an equivalent ratio of 1:1 to 1:5, particularly, in an equivalent ratio of 1:1 to 1:2.5.

According to the preparation method according to an embodiment of the present invention, the reaction may be performed in a temperature range of −80° C. to 140° C. for 1 to 48 hours.

The present invention also provides a catalyst composition comprising the compound of Formula 1.

The catalyst composition may further comprise a cocatalyst. The cocatalyst may be any one known in this art.

For example, the catalyst composition may further comprise at least one of the following Formulae 15 to 17 as a cocatalyst:

—[Al($R_{11}$)—O]$_a$—  [Formula 15]

In the above formula, each $R_{11}$ is each independently a halogen radical; a hydrocarbyl radical of 1 to 20 carbon atoms; or a halogen substituted hydrocarbyl radical of 1 to 20 carbon atoms; and a is an integer of 2 or more;

D($R_{11}$)₃  [Formula 16]

In the above formula, D is aluminum or boron; $R_{11}$ is each independently the same as defined above; and

[L-H]⁺[Z(A)₄]⁻ or [L]⁺[Z(A)₄]⁻  [Formula 17]

In the above formula, L is a neutral or a cationic Lewis acid; H is a hydrogen atom; Z is an element in group 13; and each A is each independently aryl of 6 to 20 carbon atoms or alkyl of 1 to 20 carbon atoms, where at least one hydrogen atom may be substituted with a substituent; wherein the substituent is halogen, hydrocarbyl of 1 to 20 carbon atoms, alkoxy of 1 to 20 carbon atoms or aryloxy of 6 to 20 carbon atoms.

As a preparation method of the catalyst composition, there is provided a first preparation method comprising a step of obtaining a mixture by contacting the transition metal compound represented by Formula 1 with the compound represented by Formula 15 or Formula 16; and a step of adding the compound represented by Formula 17 to the mixture.

Also, there is provided a second preparation method of the catalyst composition comprising contacting the transition metal compound represented by Formula 1 with the compound represented by Formula 17.

In the first method among the preparation methods of the catalyst composition, the molar ratio of the compound represented by Formula 15 or Formula 16 with respect to the transition metal compound of Formula 1 may be, from 1:2 to 1:5,000, particularly, from 1:10 to 1:1,000, more particularly, from 1:20 to 1:500, respectively.

Meanwhile, the molar ratio of the compound represented by Formula 17 with respect to the transition metal compound of Formula 1 may be from 1:1 to 1:25, particularly, from 1:1 to 1:10, more particularly, from 1:1 to 1:5.

If the molar ratio of the compound represented by Formula 15 or Formula 16 with respect to the transition metal compound of Formula 1 is less than 1:2, the amount of an alkylating agent is very small, and the alkylation of the metal compound may be incompletely achieved, and if the molar ratio is greater than 1:5,000, the alkylation of the metal compound may be achieved, but side reactions between the remaining excessive alkylating agent and the activating agent of Formula 17 may be carried out, and the activation of the alkylated metal compound may be incompletely achieved. In addition, if the molar ratio of the compound represented by Formula 17 with respect to the transition metal compound of Formula 1 is less than 1:1, the amount of the activating agent is relatively small, and the activation of the metal compound may be incompletely achieved, and thus, the activity of the catalyst composition may be reduced, and if the molar ratio is greater than 1:25, the activation of the metal compound may be completely achieved, but the excessive amount of the activating agent remained may increase the production cost of the catalyst composition, or the purity of the polymer thus prepared may decrease.

In the second method among the preparation methods of the catalyst composition, the molar ratio of the compound represented by Formula 17 with respect to the transition metal compound of Formula 1 may be from 1:1 to 1:500, particularly, from 1:1 to 1:50, more particularly, from 1:2 to 1:25. If the molar ratio is less than 1:1, the amount of the activating agent is relatively small, the activation of the metal compound may be incompletely achieved, and the activity of the catalyst composition thus prepared may be reduced, and if the molar ratio is greater than 1:500, the activation of the metal compound may be completely achieved, but the excessive amount of activating agent remained may increase the unit cost of the catalyst composition, or the purity of the polymer thus prepared may decrease.

As the reaction solvent used during the preparation of the composition, a hydrocarbon-based solvent such as pentane, hexane, and heptane, or an aromatic solvent such as benzene, and toluene may be used, but the present invention is not limited thereto, and all solvents used in this field may be used.

In addition, the transition metal compound of Formula 1 and the cocatalyst may be used in a supported type by a support. Silica or alumina may be used as the support.

The compound represented by Formula 15 is not specifically limited as long as it is alkylaluminoxane. Particular examples thereof may comprise methylaluminoxane, ethylaluminoxane, isobutylaluminoxane, butylaluminoxane, etc., more particularly, methylaluminoxane.

The compound represented by Formula 16 is not specifically limited, and particular examples thereof may comprise trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and more particularly, the compound is selected from trimethylaluminum, triethylaluminum, and triisobutylaluminum.

Examples of the compound represented by Formula 17 may comprise triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o, p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, etc.

A polyolefin homopolymer or copolymer may be prepared by contacting a catalyst composition comprising the transition metal compound of Formula 1; and one or more compounds selected from the compounds represented by Formula 15 to Formula 17, with one or more olefin monomers.

The particular preparation process using the catalyst composition is a solution process. If the composition is used together with an inorganic support such as silica, it may also be applied to a slurry process or a gas phase process.

In the preparation process, the activating catalyst composition may be injected after being dissolved or diluted in an aliphatic hydrocarbon solvent of 5 to 12 carbon atoms such as pentane, hexane, heptane, nonane, decane and an isomer thereof, an aromatic hydrocarbon solvent such as toluene and benzene, or a hydrocarbon solvent substituted with a chlorine atom such as dichloromethane and chlorobenzene, which are appropriate for an olefin polymerization process. The solvent used may preferably be used after removing a small amount of water or air, which functions as a catalyst poison, by treating with a small amount of alkylaluminum, and may be used by further using a cocatalyst.

The olefin monomer which is polymerizable using the metal compound and the cocatalyst may comprise, for example, ethylene, an alpha-olefin, a cyclic olefin, etc., and a diene olefin-based monomer, a triene olefin-based monomer, etc. having two or more double bonds may also be polymerized. Particular examples of the monomer may comprise ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-icocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc. Two or more of the monomers may be mixed and copolymerized.

Particularly, in the preparation method of the present invention, the catalyst composition has characteristics of preparing a copolymer having a high molecular weight and very low density comprising a polymer density of 0.890 g/cc or less, in a copolymerization reaction of ethylene and a monomer having large steric hindrance such as 1-octene even at a high reaction temperature of 90° C. or more.

According to an embodiment of the present invention, the polymer prepared by the preparation method of the present invention has a density of 0.890 g/cc or less.

According to an embodiment of the present invention, the polymer prepared by the preparation method of the present invention has a density of less than 0.890 g/cc.

In addition, according to an embodiment of the present invention, if a polymer is formed using the transition metal catalyst of Formula 1, the peak of a melting temperature (Tm) may have a single phase or two peaks.

Tm may be obtained by using a differential scanning calorimeter (DSC; Differential Scamming calorimeter 6000) manufactured by PerkinElmer Co., and may be obtained by increasing the polymer temperature to 100° C., maintaining the temperature for 1 minute, then decreasing the temperature to −100° C., and then, increasing the temperature again and measuring the apex of a DSC curve as a melting point (melting temperature).

According to an embodiment of the present invention, the polymer prepared by the preparation method of the present invention has Tm of 100 or less.

According to an embodiment of the present invention, Tm of the polymer prepared by the preparation method of the present invention may show one peak or two peaks.

MODE FOR CARRYING OUT THE INVENTION

Hereinafter, the present invention will be explained more particularly referring to the following examples. However, the examples are for assisting the understanding of the present invention, and the scope of the present invention is not limited thereto.

Synthesis of Ligand and Transition Metal Compound

Organic reagents and solvents were purchased from Aldrich Co. and used after purifying by a standard method unless otherwise noted. In all steps of syntheses, air and humidity were blocked to increase the reproducibility of experiments.

<Preparation of Ligand Compound>

Example 1

[Formula 2-1]

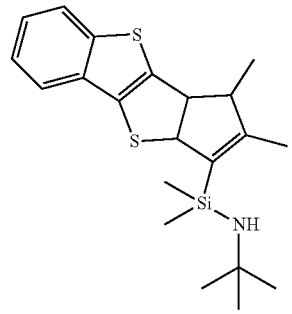

i) Preparation of benzo[b]thieno[2,3-d]thiophene

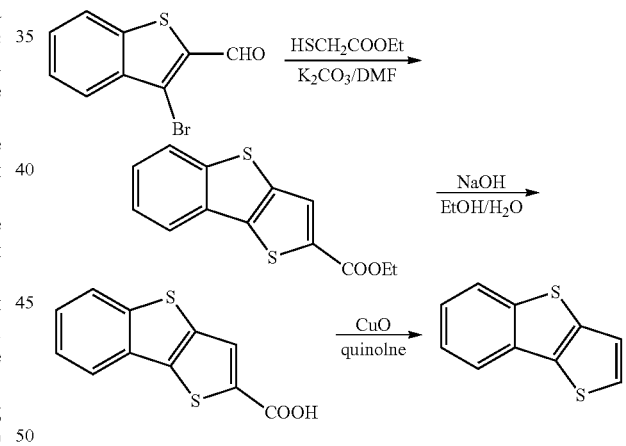

Benzo[b]thieno[2,3-d]thiophene was prepared according to the method disclosed in a document [Chem. Commun., 2012, 48, 3557].

ii) Preparation of 2,3-dimethyl-2,3-dihydro-1H-benzo[b]cyclopenta[4,5]thieno[2,3-d]thiophene-1-on

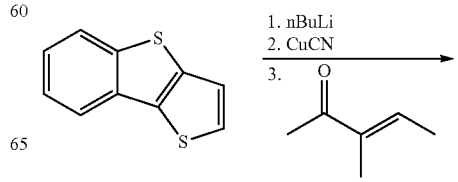

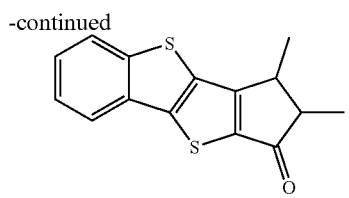

After dissolving 2.1 g of benzo[b]thieno[2,3-d]thiophene in 0.75 M THF, nBuLi was slowly added thereto dropwisely at −78° C., and the temperature was elevated to room temperature, followed by stirring for 30 minutes. The temperature was decreased to −78° C. again, and 0.5 eq of CuCN was added, followed by stirring at room temperature for 30 minutes. After stirring, 1 eq of tigloyl chloride was added thereto drop by drop at −78° C. In this case, each time in droplets, the color changed to orange, and in a final yellowish orange slurry state, the reaction was carried out at room temperature for 16 hours. After finishing the reaction, the reaction solution was put in an ice bath, 3 N HCl was added, and an organic layer was extracted with methylene chloride. The extracted organic layer was finally extracted with $Na_2CO_3$, dehydrated with $MgSO_4$, and vacuum dried. The vacuum dried organic material was dissolved in 20 ml of chlorobenzene into a slurry state, and 20 ml of undiluted $H_2SO_4$ was added thereto at −30° C., followed by stirring at room temperature. This solution was slowly transported using a cannular to distilled water which was cooled using an ice bath, while stirring. The solution quenched with water was extracted with diethyl ether, and an organic layer was extracted again with $Na_2CO_3$ and treated with $MgSO_4$ to obtain 2,3-dimethyl-2,3-dihydro-1H-benzo[b]cyclopenta[4,5]thieno[2,3-d]thiophene-1-on as a scarlet solid.

$^1$H-NMR (CDCl$_3$, 500 MHz, 2 isomers): 7.95, 7.90 ppm (aromatic-CH), 7.47 (aromatic-CH$_2$), 7.34-7.24 (m, aromatic-CH), 3.65 (m, CH), 3.22 (m, CH), 3.11 (m, CH), 2.66 (m, CH), 1.54 (m, CH$_3$), 1.42 (d, CH$_3$), 1.37 (d, CH$_3$), 1.31 (d, CH$_3$)

iii) Preparation of 2,3-dimethyl-1H-benzo[b]cyclopenta[4,5]thieno[2,3-d]thiophene

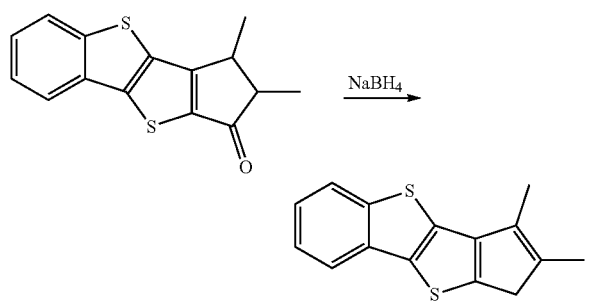

The 2,3-dimethyl-2,3-dihydro-1H-benzo[b]cyclopenta[4,5]thieno[2,3-d]thiophene-1-on thus obtained was dissolved in 0.5 M THF, and 1.5 eq of NaBH$_4$ was added thereto. In case where NaBH$_4$ was dispersed well into a slurry state, 0.5 M MeOH was added and stirred at room temperature for 3 hours. After stirring for 3 hours, an ice bath was put, and 6 N HCl was added, followed by stirring at room temperature for 1 hour. After stirring, an organic layer was extracted using ethyl acetate and hexane, and the organic layer was further extracted with NH$_4$Cl. Finally, 2,3-dimethyl-1H-benzo[b]cyclopenta[4,5]thieno[2,3-d]thiophene was obtained as a beige solid.

$^1$H-NMR (CDCl$_3$, 500 MHz): 7.81 ppm (aromatic-CH, d, 1H), 7.75 (aromatic-CH, d, 1H), 7.37 (aromatic-CH, t, 1H), 7.26 (aromatic-CH, t, 1H), 6.47 (CH, s, 1H), 3.30 (CH, q, 1H), 2.13 (CH$_3$, s, 3H), 1.37 (CH$_3$, d, 3H)

iv) Preparation of N-tert-butyl-1-(2,3-dimethyl-1H-benzo[b]cyclopenta[4,5]thieno[2,3-d]thiophene-1-yl]-1,1-dimethylsilaneamine

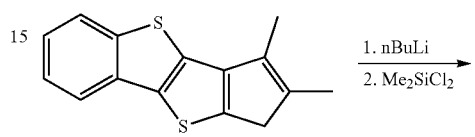

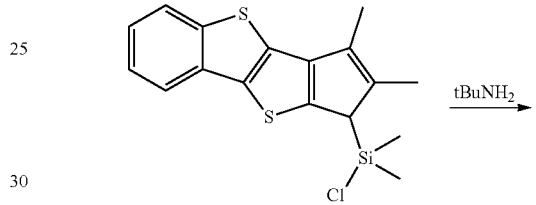

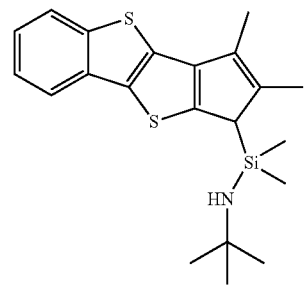

0.5 g (1.95 mmol) of the 2,3-dimethyl-1H-benzo[b]cyclopenta[4,5]thieno[2,3-d]thiophene thus obtained was dissolved in 0.2 M THF, and 1.1 eq of a nBuLi solution in 2.5 M hexane was added thereto at −78° C., followed by stirring at room temperature overnight. To a schlenk flask in which 5 eq of dimethyldichlorosilane was dissolved in THF, lithiated 2,3-dimethyl-1H-benzo[b]cyclopenta[4,5]thieno[2,3-d]thiophene was transported at −78° C. After stirring at room temperature overnight, the resultant product was vacuum dried and extracted with hexane. To the extracted solution with hexane, 6 eq of tBuNH$_2$ was added, followed by stirring at room temperature and drying in vacuum to obtain 1.7225 mmol (yield 88.3%) of N-tert-butyl-1-(2,3-dimethyl-1H-benzo[b]cyclopenta[4,5]thieno[2,3-d]thiophene-1-yl)-1,1-dimethylsilaneamine.

$^1$H-NMR (CDCl$_3$, 500 MHz): 7.84 ppm (aromatic-CH, d, 1H), 7.80 (aromatic-CH, d, 1H), 7.38 (aromatic-CH, t, 1H), 7.27 (aromatic-CH, t, 1H), 3.53 (CH, s, 1H), 2.23 (CH$_3$, s, 1H), 2.15 (CH$_3$, s, 3H), 1.26 (N—CH$_3$, s, 9H), 0.18 (Si—CH$_3$, s, 3H), −0.17 (Si—CH$_3$, s, 3H)

<Preparation of Transition Metal Compound>

Example 1A

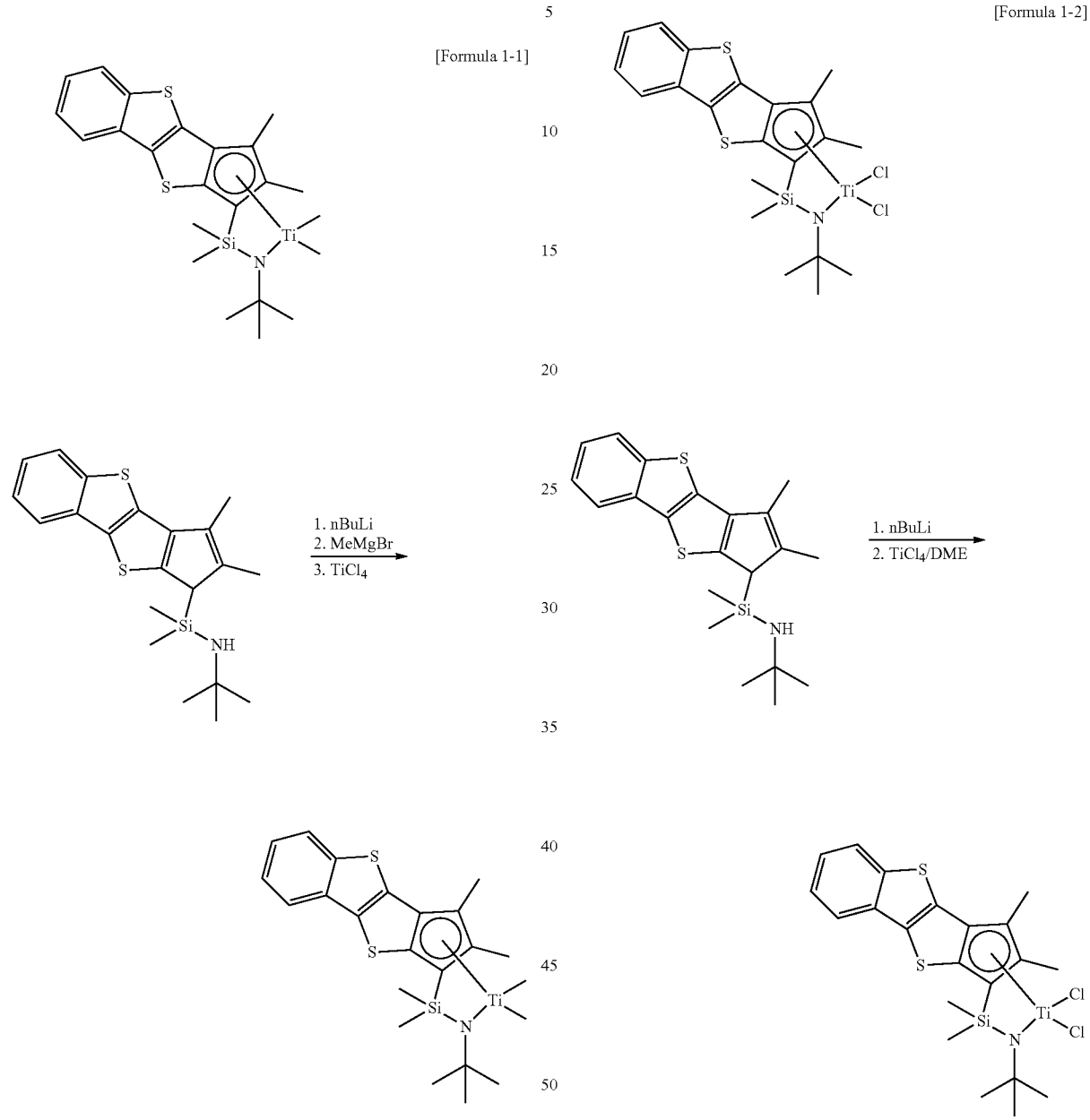

[Formula 1-1]

[Formula 1-2]

Example 2A 0.6643 g of N-tert-butyl-1-(2,3-dimethyl-1H-benzo[b]cyclopenta[4,5]thieno[2,3-d]thiophene-1-yl)-1,1-dimethylsilaneamine thus obtained was dissolved in 0.2 M toluene, 2.05 eq of a nBuLi solution in 2.5 M hexane was added thereto at −78° C. Stirring was carried out at room temperature overnight, and the temperature was decreased to −78° C. again, and 2.3 eq of MeMgBr and 1 eq of TiCl$_4$ were added in order. After vacuum drying the whole, extraction with hexane and toluene was performed to obtain 284 mg (36% yield) of the compound of Formula 1.

$^1$H-NMR (C$_6$D$_6$, 500 MHz): 7.52 ppm (aromatic-CH, d, 1H), 7.48 (aromatic-CH, d, 1H), 7.01 (aromatic-CH, m, 2H), 2.35 (CH$_3$, s, 3H), 1.86 (CH$_3$, s, 3H), 1.50 (NCH$_3$, s, 9H), 0.70 (CH$_3$, s, 3H), 0.64 (CH$_3$, s, 3H), 0.45 (CH$_3$, s, 3H), 0.13 (CH$_3$, s, 3H)

1.0 g of N-tert-butyl-1-(2,3-dimethyl-1H-benzo[b]cyclopenta[4,5]thieno[2,3-d]thiophene-1-yl)-1,1-dimethylsilaneamine obtained during the process of Example 1, was dissolved in 0.2 M toluene, and 2.05 eq of a nBuLi solution in 2.5 M hexane was added at −78° C. After stirring at room temperature overnight, the temperature was decreased to −78° C. again, and 1.05 eq of TiCl$_4$ (DME) in a solid state was added thereto. After vacuum drying the whole, extraction with hexane and toluene was performed to obtain the compound of Formula 1-2.

$^1$H-NMR (C$_6$D$_6$, 500 MHz): 7.50 ppm (aromatic-CH, d, 1H), 7.46 (aromatic-CH, d, 1H), 6.98 (aromatic-CH, m, 2H), 2.55 (CH$_3$, s, 3H), 1.99 (CH$_3$, s, 3H), 1.72 (NCH$_3$, s, 9H), 0.50 (CH$_3$, s, 3H), 0.34 (CH$_3$, s, 3H)

Comparative Example 1

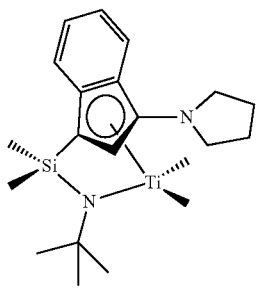

[Formula A]

The compound of Comparative Example 1 was prepared according to the method disclosed in U.S. Pat. No. 6,515,155 B1.

Comparative Example 2

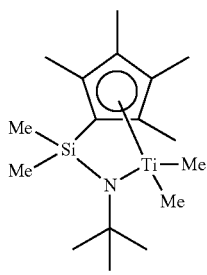

[Formula B]

Synthesis of tert-butyl)dimethyl(2,3,4,5-tetramethyl-cyclopenta-2,4-diene-1-yl)silyl)amino)dimethyltitanium $Me_2Si(Me_4C_5)NtBu]TiMe_2$ (constrained-geometry catalyst (CGC)) of Comparative Example 2 was synthesized according to U.S. Pat. No. 6,015,916.

To a 100 ml schlenk flask, the ligand compound of a comparative example (2.36 g, 9.39 mmol/1.0 eq) and 50 ml (0.2 M) of MTBE were added and stirred. n-BuLi (7.6 ml, 19.25 mmol/2.05 eq, 2.5 M in THF) was added thereto at −40° C., and then stirred at room temperature overnight. Then, MeMgBr (6.4 ml, 19.25 mmol/2.05 eq, 3.0 M in diethyl ether) was slowly added thereto dropwisely at −40° C., and $TiCl_4$ (9.4 ml, 9.39 mmol/1.0 eq, 1.0 M in toluene) was added in order, followed by stirring at room temperature overnight. Then, the reaction mixture was filtered by passing through Celite using hexane. After drying solvents, 2.52 g of a yellow solid was obtained in 82% yield.

$^1$H-NMR (in $CDCl_3$, 500 MHz): 2.17 (s, 6H), 1.92 (s, 6H), 1.57 (s, 9H), 0.48 (s, 6H), 0.17 (s, 6H)

Preparation Example of Polymers

Experimental Examples 1 to 3, and Comparative Experimental Examples 1 to 3

To a 2 L autoclave reactor, a hexane solvent (1.0 L) and 1-octene (in an amount shown in Table 1 below) were added, and the reactor was pre-heated to 150° C. At the same time, the pressure of the reactor was charged with ethylene (35 bars) in advance. A catalyst in a corresponding amount and 3 eq of a dimethylanilinium tetrakis(pentafluorophenyl) borate (AB) cocatalyst of the catalyst were injected to the reactor in order by applying argon with a high pressure. Then, a copolymerization reaction was performed for 8 minutes. After that, the remaining ethylene gas was exhausted out, and a polymer solution was added to an excessive amount of ethanol to induce precipitation. The precipitated polymer was washed with ethanol twice or three times, and dried in a vacuum oven at 90° C. for 12 hours or more, and the physical properties thereof were measured.

Various polymers were prepared in accordance with the polymerization temperature, a main catalyst and a catalyst listed in Table 1 below, and the results are shown in Table 1 below.

Evaluation of Physical Properties

<Crystallization Temperature (Tc) and Melting Temperature (Tm) of Polymer>

The crystallization temperature (Tc) of a polymer and melting temperature (Tm) of a polymer were obtained using a differential scanning calorimeter (DSC: Differential Scanning calorimeter 6000) manufactured by PerkinElmer Co. Particularly, the temperature of a copolymer was increased to 200° C. under a nitrogen atmosphere and kept for 5 minutes. Then, the temperature was decreased to 30° C. and then, a DSC curve was observed while increasing the temperature again. In this case, the temperature increasing rate and decreasing rate were 10° C./min, respectively. In the measured DCS curve, the crystallization temperature was the maximum position of heating peak during cooling, and the melting temperature was the maximum position of heat absorption peak during secondly increasing the temperature.

<Density of Polymer>

The density of a polymer was obtained by manufacturing a sheet having a thickness of 3 mm and a radius of 2 cm using a press mold at 190° C., annealing thereof at room temperature for 24 hours, and conducting measurement using a Mettler balance.

<Octene Content>

Octene (wt %) was secured from a peak relating to a $C_6$-branch which was produced by incorporating a 1-octene comonomer, through 500 MHz $^1$H-NMR. 1H-NMR was analyzed by dissolving in TCE-d2 at 120° C.

<Measurement of Availability of a Product Having Low Density and High Molecular Weight in Accordance with Temperature>

TABLE 1

| Cat. | Cat. (compound) (injection amount) | 1-octene injection amount (mL) | Polymerization temperature (° C.) | Density (g/cc) | Octene (wt %) | Tc (° C.) | Tm (° C.) |
|---|---|---|---|---|---|---|---|
| Experimental example 1 | Formula 1-1 (3 μmol) | 300 | 150 | 0.863 | 39.3 | 40.2 | 49.2 |

TABLE 1-continued

| Cat. | Cat. (compound) (injection amount) | 1-octene injection amount (mL) | Polymerization temperature (° C.) | Density (g/cc) | Octene (wt %) | Tc (° C.) | Tm (° C.) |
|---|---|---|---|---|---|---|---|
| Experimental example 2 | Formula 1-1 (1.5 μmol) | 200 | 150 | 0.872 | 33.1 | 51.2 | 61.2 |
| Experimental example 3 | Formula 1-1 (1.5 μmol) | 200 | 130 | 0.868 | 35.8 | 46.4 | 57.2 |
| Comparative Experimental Example 1 | Formula A (3 μmol) | 300 | 150 | 0.907 | 11 | 91.0 | 107.1 |
| Comparative Experimental Example 2 | Formula B (1.5 μmol) | 200 | 150 | 0.904 | 12.2 | 86.2 | 104.0 |
| Comparative Experimental Example 3 | Formula B (1.5 μmol) | 350 | 150 | 0.893 | 46.5 | 74.6 | 92.4 |

AB: dimethylanilinium tetrakis(pentafluorophenyl) borate cocatalyst

In Table 1, when comparing Experimental Example 1 with Comparative Experimental Example 1, and Experimental Example 2 with Comparative Experimental Example 2, though the amounts injected of 1-octene during polymerization were the same, it was found that the octene contents in polymers prepared in Experimental Examples 1 and 2 were markedly large, and density was also relatively very low.

Through this, the transition metal compound of Formula 1-1, which was a catalyst used in Experimental Example 1, was found to have excellent copolymerization capability when compared with the compound of Formula A which was a catalyst of Comparative Experimental Example 1, and a compound of Formula B which was a catalyst of Comparative Experimental Example 2, and the preparation of a copolymer with a low density was secured.

Through this, it was found that the copolymerization capability of the transition metal compound of Formula 1-1 which was a catalyst used in Experimental Example 1 was markedly better when compared with the compound of Formula A which was a catalyst of Comparative Experimental Example 1, and a compound of Formula B which was a catalyst of Comparative Experimental Example 2.

Meanwhile, Experimental Example 3 was an example of increasing the injection amount of 1-octene when compared with Comparative Experimental Example 2 for the preparation of a copolymer with a low density. According to the increase of the injection amount of 1-octene, it was found that the octene content of the copolymer thus prepared was increased, and the density of the copolymer was decreased. However, in this case, the density was high when compared with the copolymers prepared in Experimental Examples 1 to 3.

If the amount used of 1-octene which was a comonomer was increased, the density of the copolymer was decreased, but with the increase of the injection amount of 1-octene, economic feasibility was degraded and defects of generating remaining octene odor arisen after producing products. In addition, a process for separating octene required a lot of energy. Considering these points, a catalyst having excellent copolymerization capacity is required during commercial production. The transition metal compound of Formula 1-1 which is capable of polymerizing olefin only with a small amount of a comonomer, has excellent copolymerzation capacity when compared with the compound of Formula A which is a catalyst of Comparative Experimental Example 1, and a compound of Formula B which is a catalyst of Comparative Experimental Examples 2 and 3, and thus, may be usefully used for the preparation of a copolymer.

The invention claimed is:
1. A transition metal compound represented by the following Formula 1:

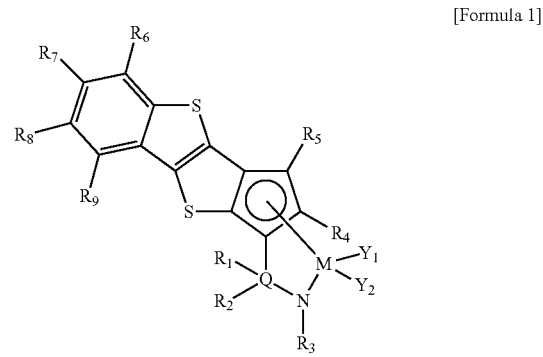

[Formula 1]

in Formula 1,
$R_1$ and $R_2$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms,
$R_3$ is hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms,
$R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; wherein adjacent two or more among $R_4$ to $R_9$ are optionally connected with each other to form a ring,
Q is Si, or C,
M is a transition metal in group 4, and
$Y_1$ and $Y_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

2. The transition metal compound according to claim 1, wherein $R_1$ and $R_2$ are each independently hydrogen; halogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_3$ is hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, $R_4$ to $R_9$ are each independently hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms, wherein adjacent two or more among $R_4$ to $R_9$ are optionally connected with each other to form an aliphatic ring of 5 to 20 carbon atoms or an aromatic ring of 6 to 20 carbon atoms; and the aliphatic ring or the aromatic ring is optionally substituted with halogen, alkyl of 1 to 20 carbon atoms, alkenyl of 2 to 12 carbon atoms, or aryl of 6 to 12 carbon atoms, Q is Si, M is Ti, and $Y_1$ and $Y_2$ are each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; or arylamino of 6 to 12 carbon atoms.

3. The transition metal compound according to claim 1, wherein $R_1$ and $R_2$ are each independently hydrogen; halogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms, $R_3$ is hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, $R_4$ to $R_9$ are each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms, wherein adjacent two or more among $R_4$ to $R_9$ are optionally connected with each other to form an aliphatic ring of 5 to 12 carbon atoms or an aromatic ring of 6 to 12 carbon atoms; and the aliphatic ring or the aromatic ring is optionally substituted with halogen, alkyl of 1 to 12 carbon atoms, alkenyl of 2 to 12 carbon atoms, or aryl of 6 to 12 carbon atoms, Q is Si, M is Ti, and $Y_1$ and $Y_2$ are each independently hydrogen; halogen; alkyl of 1 to 12 carbon atoms; or alkenyl of 2 to 12 carbon atoms.

4. The transition metal compound according to claim 1, wherein $R_1$ and $R_2$ are each independently hydrogen; halogen; alkyl of 1 to 12 carbon atoms; cycloalkyl of 3 to 12 carbon atoms; or alkoxy of 1 to 12 carbon atoms, $R_3$ is hydrogen; halogen; alkyl of 1 to 12 carbon atoms; cycloalkyl of 3 to 12 carbon atoms; alkenyl of 2 to 12 carbon atoms; or alkoxy of 1 to 12 carbon atoms, $R_4$ and $R_5$ are each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms, $R_6$ to $R_9$ are each independently hydrogen; halogen; alkyl of 1 to 12 carbon atoms; or cycloalkyl of 3 to 12 carbon atoms, Q is Si, M is Ti, and $Y_1$ and $Y_2$ are each independently hydrogen; halogen; alkyl of 1 to 12 carbon atoms; or alkenyl of 2 to 12 carbon atoms.

5. The transition metal compound according to claim 1, wherein $R_1$ to $R_3$ are each independently hydrogen or alkyl of 1 to 12 carbon atoms, $R_4$ and $R_5$ are each independently hydrogen; alkyl of 1 to 12 carbon atoms; or phenyl, $R_6$ to $R_9$ are each independently hydrogen or methyl, Q is Si, M is Ti, and $Y_1$ and $Y_2$ are each independently hydrogen; halogen; or alkyl of 1 to 12 carbon atoms.

6. The transition metal compound according to claim 1, wherein the compound represented by Formula 1 is a compound represented by any one among the following formulae:

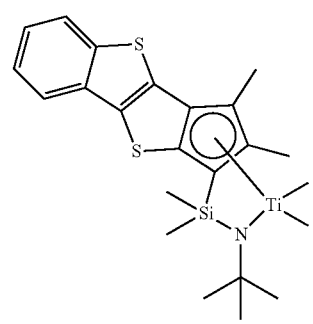

[Formula 1-1]

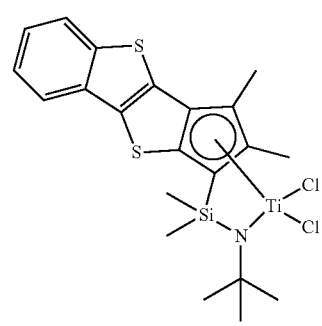

[Formula 1-2]

-continued

[Formula 1-3]

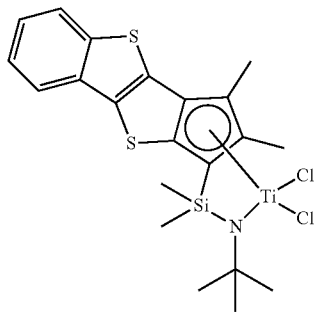

[Formula 1-4]

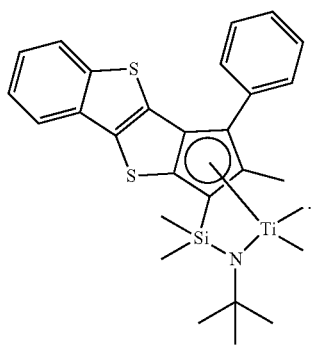

7. A method for preparing the transition metal compound of claim 1, by reacting a compound represented by Formula 2 below with an organolithium compound; one or more among the compounds represented by Formula 13a and Formula 13b below; and a compound represented by Formula 14 below:

[Formula 2]

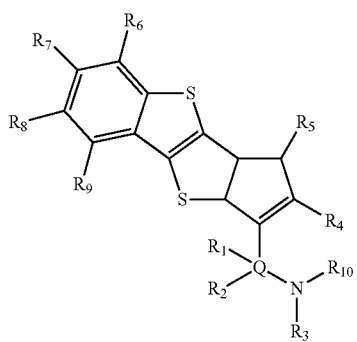

[Formula 13a]

$Y_1MgBr$

[Formula 13b]

$Y_2MgBr$

[Formula 14]

$MX_4$

[Formula 1]

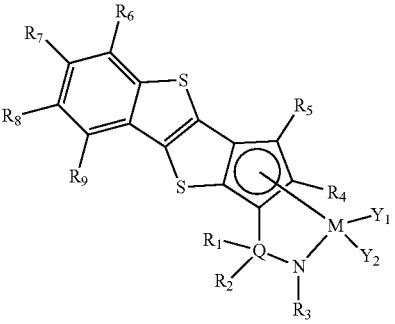

in the above formulae, $R_1$ to $R_{10}$, Q, M, $Y_1$ and $Y_2$ are the same as defined in Formula 1.

8. A catalyst composition comprising the transition metal compound according to claim 1, and being a polymerization catalyst of polyolefin.

9. The catalyst composition according to claim 8, further comprising one or more cocatalysts.

10. The catalyst composition according to claim 9, wherein the cocatalyst comprises one or more compounds selected from the following Formulae 15 to 17:

[Formula 15]

—[Al($R_{11}$)—O]$_a$— where $R_{11}$ is each independently a halogen radical; a hydrocarbyl radical of 1 to 20 carbon atoms; or a halogen substituted hydrocarbyl radical of 1 to 20 carbon atoms; and a is an integer of 2 or more;

[Formula 16]

$D(R_{11})_3$ where D is aluminum or boron; and each $R_{11}$ is independently the same as defined above;

[Formula 17]

$[L-H]^+[Z(A)_4]^-$ or $[L]^+[Z(A)_4]^-$ where L is a neutral or a cationic Lewis acid; H is a hydrogen atom; Z is an element in group 13; and A is each independently aryl of 6 to 20 carbon atoms or alkyl of 1 to 20 carbon atoms, where one or more hydrogen atoms are optionally substituted with a substituent; and the substituent is halogen, hydrocarbyl of 1 to 20 carbon atoms, alkoxy of 1 to 20 carbon atoms, or aryloxy of 6 to 20 carbon atoms.

11. The catalyst composition according to claim 9, wherein the catalyst composition further comprises a reaction solvent.

12. A method for preparing a polymer using the catalyst composition according to claim 8.

13. The method for preparing a polymer according to claim 12, wherein the polymer is a homopolymer or a copolymer of polyolefin.

* * * * *